United States Patent [19]

Cope

[11] Patent Number: 4,585,133
[45] Date of Patent: Apr. 29, 1986

[54] COUPLER FOR CONVERTIBLE RAIL-HIGHWAY SEMI-TRAILER

[75] Inventor: Geoffrey W. Cope, Williamsville, N.Y.

[73] Assignee: AMSTED Industries Incorporated, Chicago, Ill.

[21] Appl. No.: 600,276

[22] Filed: Apr. 12, 1984

[51] Int. Cl.$^4$ ............................ B61G 1/28; B60D 1/00
[52] U.S. Cl. .................................... 213/206; 213/188; 280/477; 403/13
[58] Field of Search .......................... 24/614, 615, 616; 213/188, 192, 205, 206; 280/477, 478, 515; 403/13, 14

[56] References Cited

U.S. PATENT DOCUMENTS

| | | | |
|---|---|---|---|
| 927,334 | 7/1909 | Dobbs | 213/192 |
| 996,072 | 6/1911 | Fitzpatrick et al. | 213/205 X |
| 1,462,188 | 7/1923 | Barks | 213/205 |
| 2,153,305 | 4/1939 | Gumkowski | 213/205 |
| 4,131,296 | 12/1978 | Strader | 280/477 X |
| 4,202,277 | 5/1980 | Browne et al. | 105/215 C |

FOREIGN PATENT DOCUMENTS

| | | | |
|---|---|---|---|
| 58469 | 9/1891 | Fed. Rep. of Germany | 213/188 |
| 10532 | of 1886 | United Kingdom | 213/188 |

Primary Examiner—Robert B. Reeves
Assistant Examiner—David F. Hubbuch
Attorney, Agent, or Firm—Charles E. Bouton; Edward J. Brosius

[57] ABSTRACT

A convertible semi-trailer for highway and railroad modes of travel includes a coupler device to releasably couple adjacent vehicles end-to-end to form a train for the railroad mode. The coupler includes a male member extending from the end of one of the vehicles and the housing attached to the opposed end of the adjacent vehicles and having an opening therethrough for receiving the male member of the one vehicle. The male member is releasably locked in the housing opening for railroad mode of operation. A resilient pad is positioned in the opening of the housing and has the male member resting thereon to accommodate limited rolling, pitching and relative vertical displacement between the coupled vehicles.

4 Claims, 6 Drawing Figures

COUPLER FOR CONVERTIBLE RAIL-HIGHWAY SEMI-TRAILER

BACKGROUND OF THE INVENTION

This invention relates to vehicles convertible from highway to railroad mode of travel and vice versa, and in particular, to the coupler apparatus employed to join adjacent vehicles together to form a train for the railroad mode.

The utilization of a single vehicle that may be convertible from highway to railroad mode of travel has distinct advantages that may be readily recognized. For example, when the vehicle is transferred from one mode of operation to another, since the same vehicle will be employed, it is not necessary to off-load any cargo from, for example, a railroad vehicle to a highway vehicle or vice versa. By utilizing the same vehicle for both highway and railroad modes of travel, significant savings in time and labor may be obtained.

In the railroad mode of operation, adjacent vehicles are coupled end-to-end to form a train. As is the case with standard railroad car couplers, the coupling device used on the dual mode vehicles must accommodate limited rolling, pitching and relative vertical displacement between coupled vehicles. Heretofore, it has been suggested that a spherical bushing diposed in a vertically extending hole of the male member of the coupling device, in combination with a spherical seat, will provide suitable means for accommodating the limited relative motion between adjacent vehicles. The foregoing design results in metal-to-metal contact between the spherical bushing and the spherical seat. Under conditions when rust or other foreign matter accumulate on the seat, the required articulation of the spherical bushing and associated male coupling member may be made quite difficult whereby high stresses may be produced in the coupling male member. Further, this design is expensive as it requires a significant amount of machinery.

Accordingly, it is an object of the invention to couple adjacent vehicles of a convertible rail-highway semi-trailer operating in the railroad mode with relatively inexpensive coupling means that can accommodate limited rolling, pitching and relative vertical displacement between coupled vehicles.

SUMMARY OF THE INVENTION

The foregoing object of the invention is attained in a vehicle convertible from highway to railroad mode of travel and vice versa including means to releasably couple adjacent vehicles end-to-end to form a train for the railroad mode, the coupling means including a male member extending from the end of one of the vehicles, and a housing attached to the opposed end of the other of said vehicles, and having a slot opening therethrough for receiving the male member of said one vehicle, means for releasably locking said male member in said slot, wherein the improvement comprises means for accommodating limited rolling, pitching and relative vertical displacement between coupled vehicles including a resilient pad positioned in the slot of said housing for supporting said male member.

DESCRIPTION OF THE PREFERRED EMBODIMENTS

Figure 1:
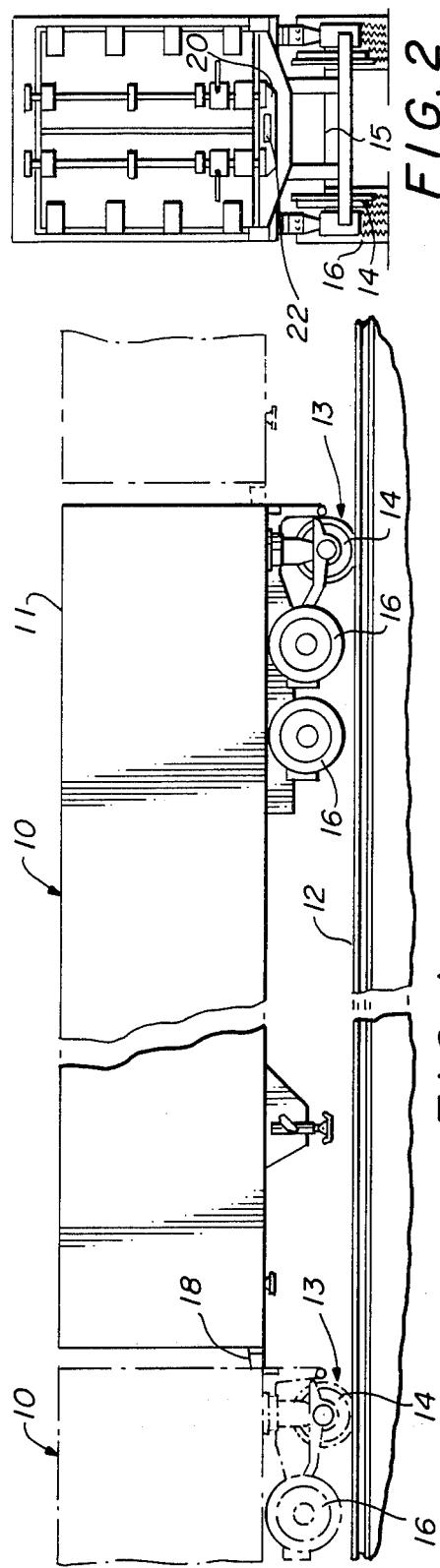
FIG. 1 is a diagrammatic side elevational view of the vehicle in the railroad mode of operation with adjacent vehicles coupled end-to-end to form a train.

Referring now to the various figures of the drawing, there is disclosed preferred embodiments of the present invention. In referring to the various figures, like numerals shall refer to like parts.

Figure 2:
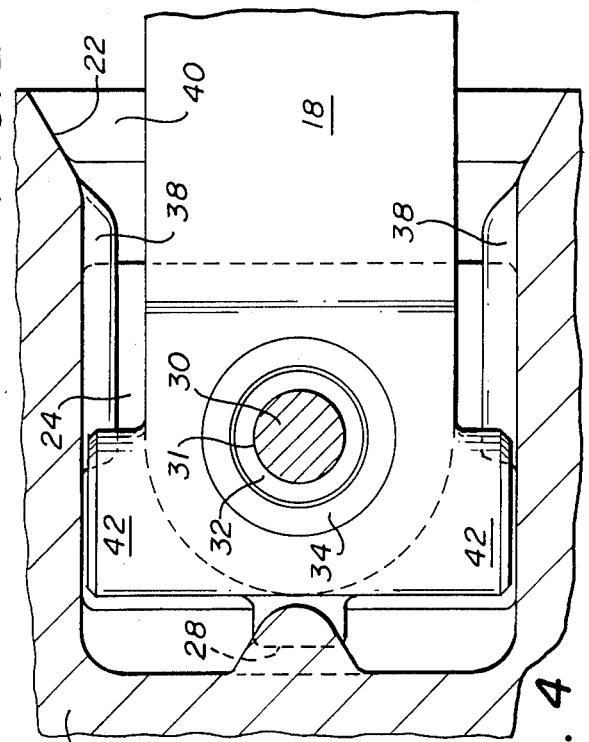
FIG. 2 is a rear elevational view of the vehicle in the highway mode.

Referring particularly to FIGS. 1 and 2, there is disclosed a vehicle 10 including a body 11 of conventional semi-trailer dimensions which could be 45' long. Vehicle 10 has a male coupling member 18 at one end, and a housing 20 at its other end to receive the male coupler of an adjacent vehicle to form a train for the railroad mode of operation. Housing 20 includes opening 22 formed therein for receiving the male member.

The vehicle further includes a railroad truck 13 having a single axle 15 (illustrated in FIG. 2) mounting flanged railroad wheels 14 for riding on railroad tracks 12. The vehicle further includes rubber tire wheels 16 for the highway mode of operation.

Figure 3:
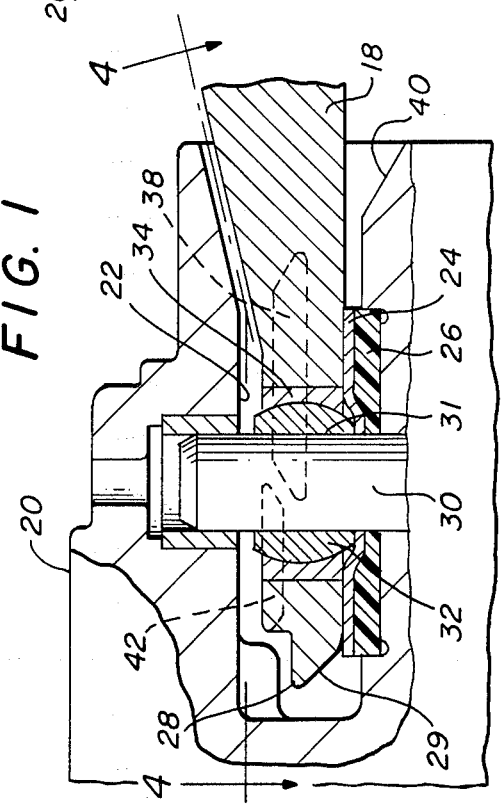
FIG. 3 is a vertical section of the coupler illustrating details of the present invention.

The coupling means formed by male member 18 and housing 20 must accommodate limited rolling, pitching and relative vertical displacement between coupled vehicles. The deatils of the coupling means shall now be described with particular reference to FIGS. 3 and 4, wherein a first embodiment of the present invention is illustrated. As indicated previously, housing 20 is formed with a hole or opening 22. The opening is provided for accepting male coupling member 18.

The central portion of male coupling member 18 includes a vertical hole 31. Pivot pin 30 is provided for insertion through hole 31. In addition to functioning as the pivot about which male coupling member 18 articulates, pin 30 also functions as a removable lock for maintaining the male member in opening 22. A spherical bearing comprising an inner bushing 32 and an outer bushing 34 are maintained within hole 31 by suitable means such as staking or set screws. The bottom face of male coupling member 18 is supported on a seat comprising wear plate 24 and elastomeric pad 26. Elastomeric pad 26 in turn is supported on the bottom face of opening 22. Wear plate 24 is provided to prolong the useful life of elastomeric pad 26. Elastomeric pad 26 in combination with the spherical bearing, permits limited relative pitching, rolling and vertical displacement between adjacent vehicles.

Figure 4:
FIG. 4 is a sectional view taken along line 4—4 of FIG. 3.

Male coupling member 18 includes nose portion 28. Guide lugs 42 extend outward from the side of nose portion 28 as is illustrated in FIG. 4. The lower face of opening 22 includes a ramp-like surface 40. Nose portion 28 includes a lifting surface 29 which has a complementary configuration to ramp-like surface 40. When the lifting surface 29 of coupling member 18 is guided into contact with ramp-like surface 40, coupling member 18 is guided vertically upward within opening 22. The foregoing arrangement prevents the coupling member from damaging wear plate 24 and elastomeric pad 26 as the coupling member is initially brought into the opening. The coupling member is then moved vertically upward within opening 22 by engagement of coupling guide lugs 42 with coupling guide surfaces 38 extending radically outward from housing 20. This raises the coupler still further to clear wear plate 24 and pad 26 during the inward movement of the coupler. Just prior to full inward movement, lugs 42 and 38 become disengaged and the coupler is allowed to contact underlying pad 26.

Figure 5:
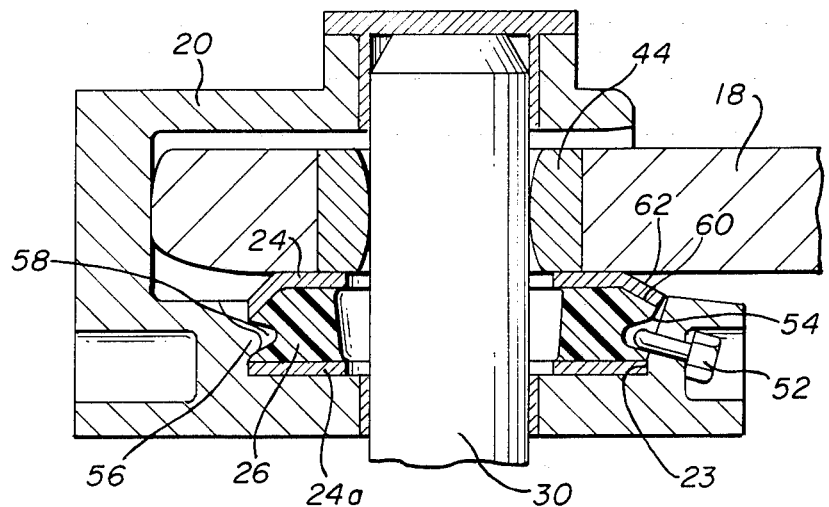
FIG. 5 is a sectional view, similar to FIG. 3, showing and alternative embodiment of the present invention.

Referring now to FIG. 5, there is illustrated a first alternative embodiment of the invention. In particular, in the embodiment illustrated in FIG. 5, guide surfaces 38 and guide lugs 42 are omitted. Further, spherical bearing comprises a single spherical bushing 44 as compared to the inner and outer bushings illustrated in FIG. 3. Elastomeric pad 26 is sandwiched between wear plates 24 and 24a. Coupling member 18 is supported upon the upper surface of wear plate 24 while the bottom face of wear plate 24a rests on the lower surface of opening 22. Housing 20 includes a lip 56. The rear surface of elastomeric pad 26 facing lip 56 includes an inwardly deformed portion 58 having a configuration complementary to lip 56. The lip is received within inwardly deformed portion 58 and functions to restrain upward movement of the pad relative to the housing. In addition, one or more set screws 52 may be maintained in housing 20 as illustrated at the lower right hand corner of FIG. 5. The set screw is affixed in the housing and engages an inwardly deformed portion 54 of resilient pad 26. The set screw functions to restrain upward motion of the pad with respect to the housing and thereby retain it in position when pin 30 is withdrawn and the vehicle is in motion in highway service.

It should be noted wear plate 24 and pad 26 include ramp-like portions respectively 58 and 60 to guide the coupling member as it enters opening 22. Further, by positioning pad 26 and wear plates 24 and 24a within pocket 23 of opening 22, the plates and pad resist the longitudinal thrust of the coupling member as it moves inwardly within the opening.

Figure 6:
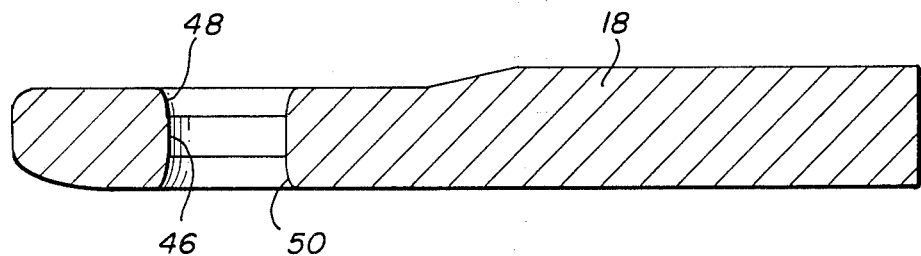
FIG. 6 is a sectional view of a detail of the present invention illustrating yet another embodiment.

Referring now to FIG. 6, there is illustrated still another embodiment of the present invention. In this embodiment, male member 18 includes a vertically extending hole 46 having tapered upper and lower portions respectively 48 and 50. Hole 46 is provided for receiving pin 30. The tapered portions accommodate relative movement of the male member with respect to the pin and provides the same function as the spherical bearings illustrated in FIGS. 3 and 5.

By providing a resilient pad for supporting the coupling member on pin 30, limited rolling, pitching and relative vertical displacement between coupled vehicles can be readily accommodated. Unlike the prior art arrangements which have included metallic spherical seats, rust or other foreign matter which may accumulate within opening 22, should not prevent the required articulation of the male coupling member. In the prior art arrangement having the spherical seats, the foreign matter could be captured between the seat and spherical bushing causing the parts to wear and in addition, preventing male member 18 from articulating about pin 30. Further, by providing pad 26, the support surface area for male member 18 is increased when compared to the spherical seat. Thus, the weight of the male coupling member is spread over a larger surface area to minimize the possibility of localized fatigue in the seat. The resiliency provided by elastomeric pad 26 will permit limited relative rolling, pitching and vertical displacement of the male coupling member during routine operation of the train.

While preferred embodiments of the present invention have been described and illustrated, the invention should not be limited thereto, but may be otherwise embodied within the scope of the following claims.

The embodiments of the invention in which an exclusive property or privilege is claimed are defined as follows:

1. In a vehicle convertible from highway to railroad mode of travel and vice versa including means to releasably couple adjacent vehicles end-to-end to form a train for the railroad mode, said coupling means including a male member extending from the end of one of the vehicles, and a housing attached to the opposed end of the other of said vehicles and having an opening therethrough for receiving the male member of said one vehicle, means for releasably locking said male member in said opening, wherein the improvement comprises:
    said housing opening having a ramp-like surface formed on the bottom wall thereof;
    said male member comprising a nose portion including a lifting surface having a complementary configuration to said ramp-like surface, with movement of said lifting surface into engagement with said ramp-like surface resulting in vertical upward movement of said male member in said opening;
    a resilient pad positioned in the opening of said housing for supporting said male member;
    inwardly extending guide surfaces formed on the opposed side walls of said housing opening; and
    said male member including guide lugs extending outward from the side of said nose portion for cooperative interengagement with said guide surfaces for guiding said male member in said housing opening including lifting said member above the upper surface of said pad to prevent the member from contacting said pad during its inward and outward movement relative to said housing opening.

2. The combination of claim 1 further including means defining a vertical hole extending through said male member and a pivot pin extending through said hole about which the limited rolling and pitching motion of said coupled vehicles occurs, said hole including tapered upward and lower portions to accommodate pivoting motion of said pin.

3. The combination of claim 1 further including a bushing disposed in a vertical hole extending through said male member and whose outer surface is spherical.

4. The combination of claim 1 including a pair of spaced apart plates sandwiching said pad, with the upper surface of one of said plates having the male member supported thereon and the lower surface of said other of said plates being supported by said housing.

* * * * *